(12) United States Patent
Koh

(10) Patent No.: US 9,244,485 B1
(45) Date of Patent: Jan. 26, 2016

(54) HIGH FREQUENCY OSCILLATOR WITH SPREAD SPECTRUM CLOCK GENERATION

(71) Applicant: Infineon Technologies AG, Neubiberg (DE)

(72) Inventor: Chin Yeong Koh, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/341,214

(22) Filed: Jul. 25, 2014

(51) Int. Cl.
*G06F 1/04* (2006.01)
*G06F 1/08* (2006.01)

(52) U.S. Cl.
CPC .................................. *G06F 1/08* (2013.01)

(58) Field of Classification Search
CPC ..................................... G06F 1/04; G06F 1/08
USPC ................. 327/105, 164, 291, 299, 590, 596; 331/57, 175
See application file for complete search history.

(56) References Cited

U.S. PATENT DOCUMENTS

| | | | |
|---|---|---|---|
| 5,212,459 A * | 5/1993 | Ueda et al. | 331/111 |
| 6,353,368 B1 * | 3/2002 | Iravani | 331/57 |
| 7,639,091 B2 * | 12/2009 | Gibet et al. | 331/34 |
| 2006/0063502 A1 * | 3/2006 | Shibuya et al. | 455/255 |
| 2007/0052486 A1 * | 3/2007 | Tseng | 331/16 |
| 2007/0176698 A1 * | 8/2007 | Gibet et al. | 331/74 |
| 2011/0115570 A1 * | 5/2011 | Chang et al. | 331/1 R |
| 2014/0159776 A1 * | 6/2014 | Elran | 327/102 |

* cited by examiner

*Primary Examiner* — William Hernandez
(74) *Attorney, Agent, or Firm* — Shumaker & Sieffert, P.A.

(57) ABSTRACT

Devices, systems, and methods for spread spectrum clock generation are disclosed. The devices, systems, and methods generate a clock signal at a frequency and generate a voltage output based on the frequency of the clock signal, wherein the generated voltage output is indicative of the frequency of the generated clock signal. The devices, systems, and methods also compare the frequency of the clock signal generated to a desired frequency output by comparing the generated voltage output to a voltage reference and adjust the frequency of the clock signal generated based on the results of the comparison.

17 Claims, 4 Drawing Sheets

HIGH FREQUENCY OSCILLATOR WITH SPREAD SPECTRUM CLOCK GENERATION

TECHNICAL FIELD

This disclosure relates to oscillators and more particular, to techniques and circuits associated with clock generation.

BACKGROUND

High frequency oscillators may be used to generate clocks for electronic circuits. High frequency oscillators, for example, may be used for spread spectrum clock generation. Some example electronic circuits that may use such clock generation include integrated circuits (ICs), which may be used to implement, for example, systems-on-a-chip, processors, and chipset chips. Spread spectrum clock generation techniques may reduce adverse effects of electro-magnetic interference (EMI).

Spread spectrum clock generation techniques may use variable frequencies that vary between a maximum frequency value and a minimum frequency value to generate different oscillator wave forms such as sine waves, triangle waves, or other shaped waves. Spread spectrum clock generation may be performed using a phase-locked loop (PLL), such as by modulating a voltage controlled oscillator (VCO) control voltage or by modulating a feedback divider ratio.

SUMMARY

In general, techniques and circuits are described that may be used to generate a clock signal using a regulated loop to produce a more well controlled spread spectrum clock signal (in some examples, accuracy may be ±2%). According to the techniques described herein, the clock signal may have a reduced dependence upon temperature relative to other techniques. In particular, the techniques may modulate an N divider by a digital delta-sigma modulator together with a triangular waveform generator to generate a clock signal that is substantially independent of temperature.

In some examples, the disclosure is directed to a method that comprises generating a clock signal at a frequency, generating a voltage output based on the frequency of the clock signal, wherein the generated voltage output is indicative of the frequency of the generated clock signal, comparing the frequency of the clock signal generated to a desired frequency output by comparing the generated voltage output to a voltage reference, and adjusting the frequency of the clock signal generated based on the results of the comparison.

In another example, the disclosure is directed to a device including a frequency generator for generating a clock signal at a frequency, a frequency-to-voltage converter coupled the frequency generator, the frequency-to-voltage converter for generating a voltage output based on the frequency of the clock signal, wherein the generated voltage output is indicative of the frequency of the generated signal, and a comparator, coupled to the frequency-to-voltage converter and configured to compare the frequency of the clock signal generated to a desired frequency output by comparing the generated voltage output to a voltage reference, wherein the frequency of the frequency generator is adjusted the frequency of the clock signal generated based on the results of the comparison.

In another example, the disclosure is directed to a device including means for generating a clock signal at a frequency, means for generating a voltage output based on the frequency of the clock signal, wherein the generated voltage output is indicative of the frequency of the generated clock signal, means for comparing the frequency of the clock signal generated to a desired frequency output by comparing the generated voltage output to a voltage reference, and means for adjusting the frequency of the clock signal generated based on the results of the comparison.

In another example, the disclosure is directed to a non-transitory computer-readable storage medium storing instructions that upon execution by one or more processors cause the one or more processors to generate a clock signal at a frequency, generate a voltage output based on the frequency of the clock signal, wherein the generated voltage output is indicative of the frequency of the generated signal, compare the frequency of the clock signal generated to a desired frequency output by comparing the generated voltage output to a voltage reference, and adjust the frequency of the clock signal generated based on the results of the comparison.

The details of one or more examples are set forth in the accompanying drawings and the description below. Other features, objects, and advantages of the disclosure will be apparent from the description and drawings, and from the claims.

DETAILED DESCRIPTION

Devices, systems, and methods for spread spectrum clock generation are disclosed. The devices, systems, and methods generate a clock signal at a frequency and generate a voltage output based on the frequency of the clock signal, wherein the generated voltage output is indicative of the frequency of the generated clock signal. The devices, systems, and methods may also compare the frequency of the clock signal generated to a desired frequency output by comparing the generated voltage output to a voltage reference and adjust the frequency of the clock signal generated based on the results of the comparison.

An example method may include generating a clock signal at a frequency, generating a voltage output based on the frequency of the clock signal, wherein the generated voltage output is indicative of the frequency of the generated clock signal, comparing the frequency of the clock signal generated to a desired frequency output by comparing the generated voltage output to a voltage reference, and adjusting the frequency of the clock signal generated based on the results of the comparison.

In some examples, the method may further include modulating an N divider by a triangular waveform generator and digital delta-sigma modulator to controlled frequency spreading of the clock signal. In some examples, generating the clock signal at the frequency comprises generating a lower frequency signal and up converting the lower frequency signal. In some examples, the method may further include generating the lower frequency using a free running clock. The method may also include spreading the clock signal to reduce electro-magnetic interference (EMI). Various devices may implement the method, including processor based devices.

Some examples, in accordance with one or more aspects of the present disclosure, may use a built in regulated loop. The built in regulated loop may be similar to a phase-locked loop (PLL) and the built in regulated loop may produce a better controlled spread spectrum clock relative to other techniques. For example, the spread spectrum clock may have an accuracy of approximately ±2%. Additionally, in some examples, the clock may not be as impacted by temperature variation as other techniques. In some examples, this is due to compensation for such temperature variations by modulating an N divider by a digital delta-sigma modulator together with a triangular waveform generator.

Figure 1:
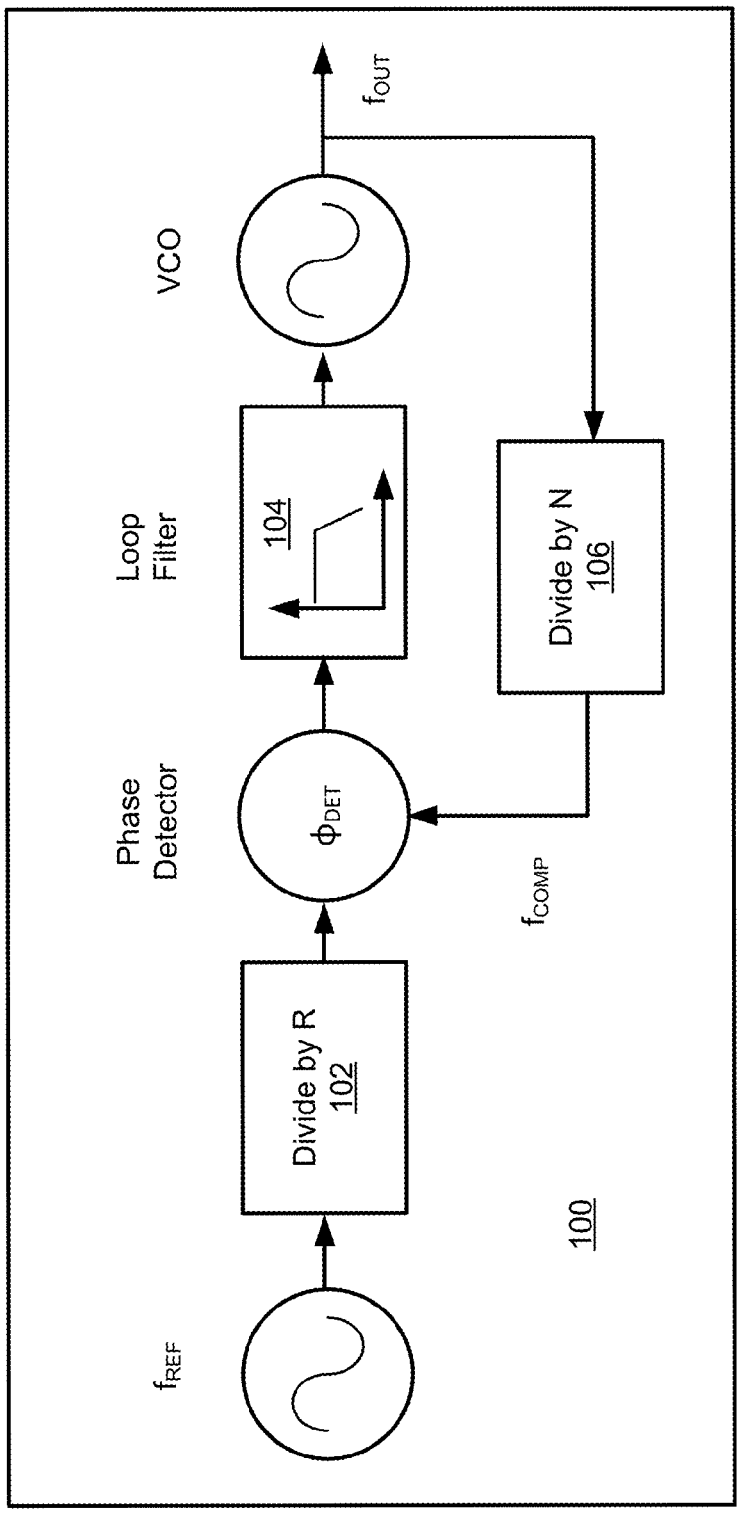
FIG. 1 is a block diagram illustrating an example clock generation circuit.

FIG. 1 is a block diagram illustrating an example clock generation circuit. In some cases, maintaining good frequency stability across supply voltage and temperature may be difficult in current free running oscillators. This may be especially true for clock frequency above 100 MHz. Furthermore, these difficulties may remain even after calibration. Moreover, the ability of a relaxation oscillator to achieve a clock frequency above 200 MHz may be limited due to its inherent comparator propagation delay. Accordingly, in some cases, a so-called "ringo" based architecture, that uses an odd number of inverters connected in a ring to generate a clock signal, may be a better option than other techniques. In still other cases, a ringo based architecture oscillator may be the only useful option. When the ringo architecture is used, however, it may be very difficult to compensate to obtain a frequency stability of less than ±5% across temperature and supply voltage, $V_{DD}$, supply variation. Accordingly, due to poor frequency stability across process, voltage, and temperature (PVT) for a stand-alone ringo-based free running oscillator, it may be difficult to generate a well-controlled spread spectrum clock. For example, a stand-alone ringo-based free running oscillator may either have too large a frequency deviation or spreading may be too small.

Having too large a frequency deviation may significantly increase the jitter and critically reduce the timing margin for a certain PVT conditions. Additionally, some clock generation techniques may introduce to much electromagnetic interference (EMI). EMI may be introduced when the bandwidth of a signal is too narrow. Accordingly, frequency spreading may be used to broaden the bandwidth of the signal. Frequency spreading is a spreading out of a narrowband signal in the frequency domain such that the narrowband signal is spread over a wider frequency range than the un-spread narrower band signal. In some cases, however, a frequency spread signal may still result in a signal that is too narrowband such that the spread signal may still fail to achieving a required EMI reduction.

Some examples of this disclosure may achieve a high frequency spread spectrum clock source that is capable of reducing the EMI emission. These examples may also maintain a controlled spreading of a clock that is not subjected to variation due to PVT.

As illustrated in FIG. 1, one example circuit 100 may include a reference frequency generator, $f_{REF}$, coupled to a divide by R block 102. In the illustrated example, divide by R block 102 is coupled to a phase detector, $\phi_{DET}$, and filtered by a loop filter 104 that may be low pass filter. The output of the low pass filter may drive a voltage controlled oscillator (VCO) that provides an output, $f_{OUT}$. Output, $f_{OUT}$ may be fed back through a divide by n block 106 to generate a comparison frequency $f_{COMP}$. Comparison frequency $f_{COMP}$ may be fed back through phase detector, $\phi_{DET}$.

Circuitry 100 of FIG. 1 illustrates an example PLL that may be used to multiple an accurate low frequency free running RC based oscillator, $f_{REF}$, which may be multiplied up to a higher clock frequency. The PLL may have a built in delta-sigma modulator and triangular waveform generator to modulate the feedback divider for the frequency spreading effect. In some examples, such circuitry may significantly increase chip size and current consumption, however. The increase in chip size and current consumption may be due to the need of an additional PLL for the clock frequency multiplication.

Figure 2:
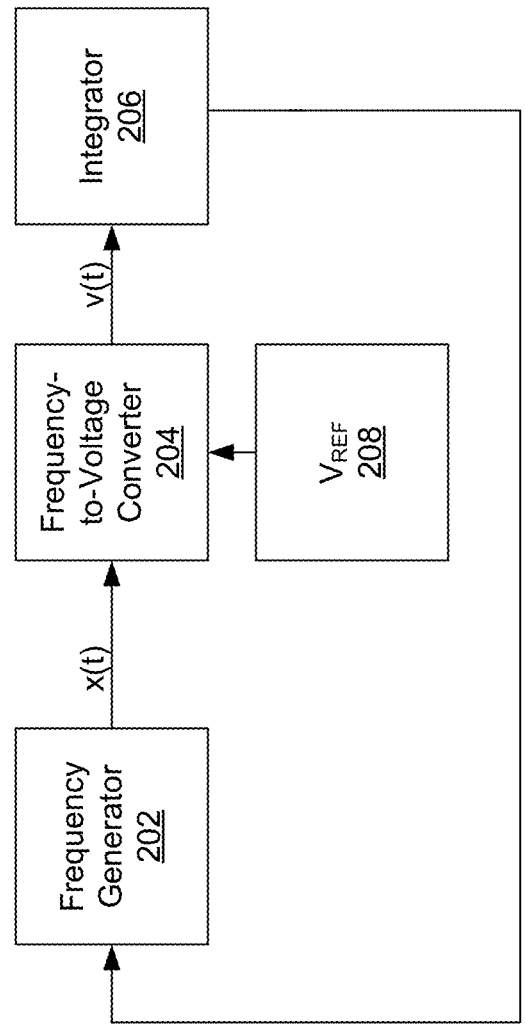
FIG. 2 is a block diagram illustrating an example clock generation circuit in accordance with one or more aspects of the present disclosure.

FIG. 2 is a block diagram illustrating an example clock generation circuit 200 in accordance with one or more aspects of the present disclosure. In the illustrated example of FIG. 2, a frequency generator 202 may generate a clock signal at a frequency. In the illustrated example of FIG. 2, an output of frequency generator 202, x(t), may be controlled using feedback, e.g., to improve the accuracy of the frequency generating in terms of frequency output, frequency output stability, or other figures of merit for oscillation circuitry. In some examples, a frequency generator may be a free running oscillator, meaning that frequency generator may be a self-oscillating circuit or a stable multivibrator. The term "free running" indicates that the circuit used oscillates at a frequency that may be determined by the specific choice of components in the circuit rather than by being controlled to oscillate at some other frequency. Accordingly, the tolerances of the components determine the frequency at which the free running oscillator is oscillating. In some examples, frequency generator 202 may comprise a ringo oscillator or ring oscillator, clock generator circuit, crystal oscillator, R-C circuit with feedback, or any other oscillating circuit. As illustrated in FIG. 2, various aspects of the circuit, as described below, may control the output frequency of, for example, up converter 210.

As illustrated in FIG. 2, a frequency-to-voltage converter 204 coupled frequency generator 202, generates a voltage output, v(t), based on the frequency of the signal, x(t). The generated voltage output, v(t), is indicative of the frequency of the generated signal, x(t). For example, frequency-to-voltage converter 204 may generate a voltage that is proportional to frequency or inversely proportional to frequency. In some examples, frequency-to-voltage converter 204 may output a voltage that is related to frequency in some other way, such as a squared or square root, cube, or cube root, logarithmic, or some other mathematical relationship between the input frequency and the output voltage.

An integrator 206 may be coupled to frequency-to-voltage converter 204. Integrator 206 may be configured to compare the frequency of the signal generated to a desired frequency output. This may be done by comparing the generated voltage output of frequency-to-voltage converter 204 to a voltage reference 208. Voltage reference 208 may generally output a fixed voltage. It will be understood, however, that no real world reference is ideal and some variation in voltage may occur. Furthermore, such a reference may be tuned or adjusted.

Various comparison circuits may be used. For example, an amplifier circuit, such as an operational amplifier circuit may be used to perform the comparison. In other examples, other comparison circuits may be used to compare the generated voltage output to a voltage reference and thereby compare the frequency of the signal generated to a desired frequency output. In other examples, digital logic might be used. For example, analog voltages may be converted to digital values and these digital values may be compared using digital logic.

The frequency of frequency generator 202 may be adjusted based on the results of the comparison, e.g., the output of integrator 206. For example, the output of integrator 206 may be an input to frequency generator 202. Thus, the frequency of frequency generator 202 may be controlled using an integrated version of the frequency generated to ramp up the control (i.e. feedback) voltage if the control voltage is smaller than $V_{REF}$ 208. The converse is also true. $V_{REF}$ may be integrated if it is smaller than the control voltage.

The systems, methods described herein may output a frequency that is not exactly the desired frequency output. The actual frequency output may vary to lessen electro-magnetic interference (EMI) or small variations in the circuitry may still be present due to temperature and other variations.

Figure 3:
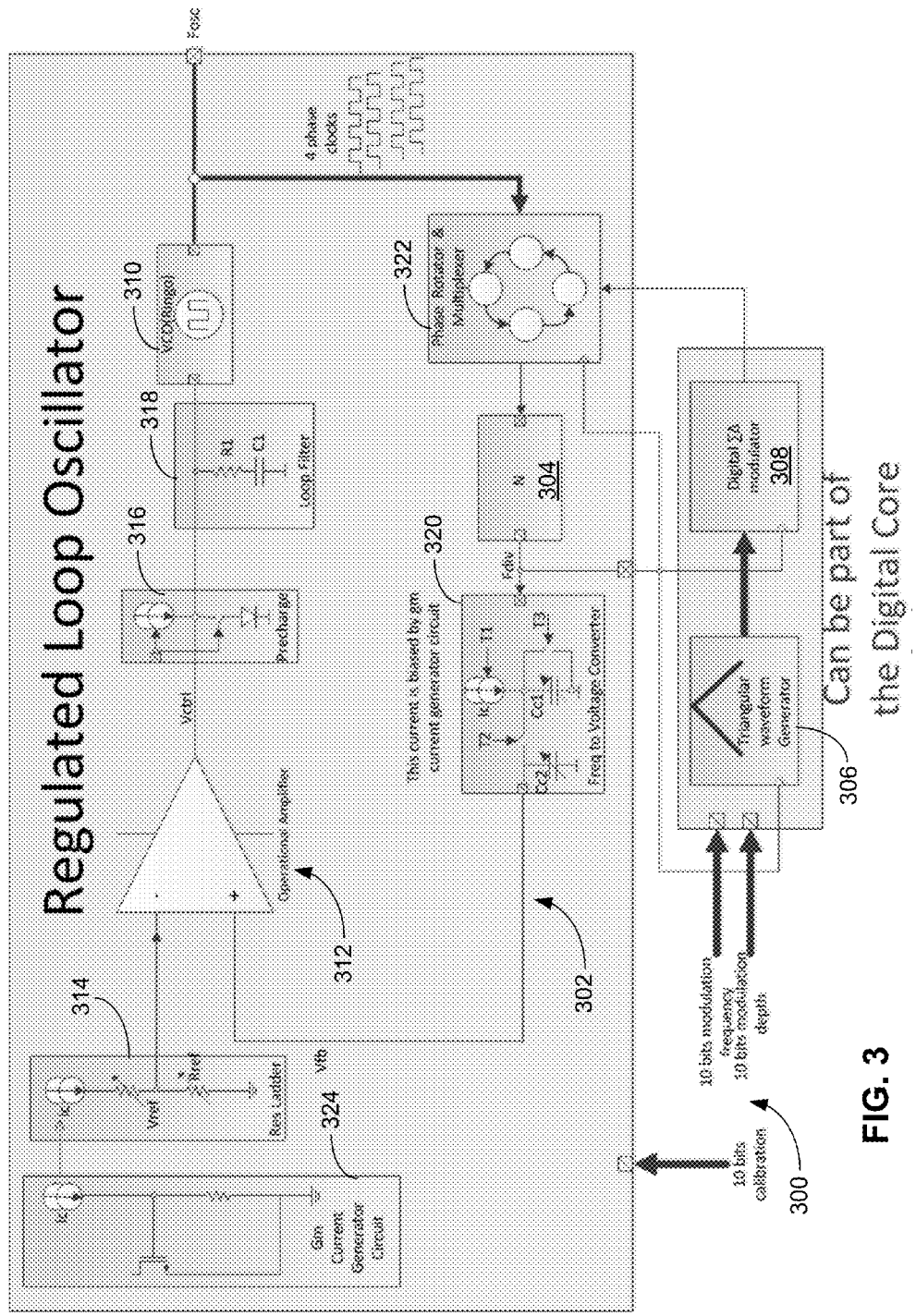
FIG. 3 is another block diagram illustrating an example clock generation circuit in accordance with one or more aspects of the present disclosure.

FIG. 3 is another block diagram illustrating an example clock generation circuit 300 in accordance with one or more aspects of the present disclosure. The example circuit 300 of FIG. 3 may utilize a regulated closed loop circuit 302 within the oscillator itself. Such circuitry 302 may greatly reduce any reliance on the characteristics of the open loop oscillator cell. In other words, regulated closed loop circuit 302 may generate a more accurate clock signal than, for example, an unregulated oscillator alone or compared to other techniques for regulating oscillator circuits. Accordingly, the circuit of FIG. 3 may provide greater frequency stability over variations in temperature and variations in supply voltage when compared to an unregulated oscillator circuit or other techniques for regulating oscillator circuits. Furthermore, the circuit of FIG. 3 may provide better frequency stability after the resistor $R_{ref}$ in the circuit of FIG. 3 is trimmed relative to an untrimmed circuit. For example, adjustments of resistor $R_{ref}$ may be used to adjust clock frequency of the clock generation circuit. This may overcome the limitation of the maximum achievable clock frequency of an RC oscillator and yet maintain reasonable clock accuracy with temperature variation, voltage variation, or variation between different semiconductor processes. With the relatively good stability of the clock frequency over temperature and after calibration as compared to other techniques and un-calibrated circuits, it may be possible to include a modulated N divider 304 into the loop. For example, with a frequency to voltage converter 320 which does not vary much with temperature whatever is modulated the frequency spread will remain approximately the same even at a different temperatures. The example of FIG. 3 may use a triangular waveform generator 306 and a digital delta sigma modulator 308, along with phase rotator/multiplexer 322 to generate a reasonabl/ile accurate (±2%) spread spectrum clock.

$$\Delta fosc = \frac{Ic*\Delta N}{2*C*(Ic*k*R)} = \frac{\Delta N}{2*C*(k*R)}$$

With the proposed scheme of FIG. 3, a dedicated PLL may no longer be required, thus saving on the amount of circuit area needed and the power consumption required. The closed loop circuit 302, as illustrated in FIG. 3, may serve a similar function to a PLL for the frequency multiplication and together with the modulation of the N divider 304 by the triangular waveform generator 306 and digital delta-sigma modulator 308, it may create a more well controlled frequency spreading which does not rely on the characteristic of the open loop ringo oscillator which may be very cumbersome and extremely difficult to design with compensation to have good frequency stability over temperature and supply voltage after calibration. Modulating a free running ringo oscillator and to maintain the same frequency spreading of less than ±5% may be difficult across temperature changes even with a compensating circuit.

Essentially, for the proposed architecture of FIG. 3, the frequency spreading accuracy may not be affected by supply voltage variation, but may be dependent on temperature, since it may depend heavily now on the temperature coefficients of the passive resistor and capacitor in the frequency to voltage converter 310. But as compared to normal active transistors in a ringo oscillator, the temperature variation effect may be significantly smaller.

In some examples, closed loop circuit 302 may provide a built in regulated loop that may perform similar functionality to a PLL. Using closed loop circuit 302, the circuit of FIG. 3 may be able to produce a better controlled spread spectrum clock relative to other techniques. For example, the accuracy of the clock frequency may be ±2% for some clock generation circuitry implementing the techniques of this disclosure. Furthermore, modulating the N divider 304 by a digital delta-sigma modulator 308 together with a triangular waveform generator 306 may result in a circuit that is not as subjected to temperature relative to other techniques.

Because of the feedback architecture, the two inputs, $v_{ref}$ and $v_{fb}$, of amplifier 312 will be equal in voltage when the desired frequency and the generated frequency are in equilibrium, e.g., at the same frequency. The output clock frequency transfer function, $v_{ctrl}$, is indicated below. As shown below, the parameters may generally depend on only the temperature coefficients of the resistor, $r_{ref}$, used in the reference voltage generator 314 and the capacitor used in the voltage to frequency converter 310.

$$fosc = \frac{Ic*N}{2*C*vref}$$

The voltage ($v_{ref}$) is basically generated from resistor $r_{ref}$ and the current from the current source 324, $g_m$. This current may be derived from the same source as current ($I_c$). Thus, these can be cancelled off in the first order and the equation can be further simplified below in which $v_{ref}=I_c*k*R$.

$$fosc = \frac{N}{2*C*R*k}$$

$$\Delta fosc = \frac{Ic*\Delta N}{2*C*(Ic*k*R)} = \frac{\Delta N}{2*C*(k*R)}$$

To further reduce the perturbation of the loop and to minimize the cycle to cycle jitter degradation for every clock update, phase switching (N+1/4, N) may be employed instead of conventional integer switching, (N+1, N) may be used for fractional division. The block diagram of FIG. 3 includes a $g_m$ biasing circuit. The block diagram of FIG. 3 further includes reference voltage generator 314 in the form of a resistor ladder for calibration. As illustrated in FIG. 3, $v_{ref}$ may be generated by the current flow from a current source through $R_{ref}$. The reference voltage may be tuned by modifying the resistance, $R_{ref}$. In some examples, $v_{ref}$ may be about halfway between the supply voltages. Generally, the supply voltages may be a positive voltage and ground. In other examples, the supply voltages may be a positive supply voltage and a negative supply voltage. Amplifier 312 may comprise an operation amplifier in the illustrated example of FIG. 3 and may form an operational trans-conductance (OTA) amplifier. The illustrated example of FIG. 3 also includes pre-charge circuit 316, loop filter 318, ring oscillator 310, phase rotator/multiplexer 322, digital divider 304, frequency-to-voltage converter (FVC) 320, digital delta-sigma modulator 308 and triangular waveform generator 306.

Ignoring, for the moment, phase rotator/multiplexer 322, in the illustrated example of FIG. 3, loop filter 318 may stabilize closed loop circuit 302 and provide a control voltage to VCO, e.g., ring oscillator 310. Loop filter 318 may reduce the high frequency component of $V_{CTRL}$. This may keep high frequency modulation from reaching the VCO. Generally low frequency modulation for control of the VCO is what is desired. In one example, the signal may have frequency components around 50 kHz to create a gradual spreading, relative to the frequency of the oscillator output frequency. This small variation in clock frequency cause by the low frequency component (e.g., around 50 kHz) may help reduce EMI. The output of ring oscillator 310 may be divided by N divider 304 and fed to frequency-to-voltage converter (FVC) 320. In some examples, N divider 304 may be modulated, also to introduce jitter that may reduce EMI. For example, a system implementing this circuitry may switch between N and N+1. Phase rotator 322 may provide fine grain control, while the N divider 304 may provide a more coarse control of the spread spectrum clock.

Capacitors in FVC 320 may be charged by the input signal and this charge may provide a voltage output that is related to the frequency of the signal. For example, may be proportional to the frequency in some examples. The voltage output from FVC 320 is an input to comparator of amplifier 312.

The $g_m$ biasing circuit may provide reference current to the resistor ladder, i.e., reference voltage generator 314 and FVC 320. The ratio of the current going into the resister ladder to the current going down the $g_m$ generator circuit, e.g., supplying current to the frequency to voltage converter 320 may be represented by K. By having its own biasing circuit, the module may be completely stand alone and may not require an external reference voltage or current from band gap circuit.

When frequency is lower at the output than desired, the feedback voltage, $v_{fb}$, is larger than the reference voltage, $v_{ref}$, and the control voltage to the VCO is lower than expected to achieve the targeted clock frequency. Conversely, when frequency is higher at the output desired, the feedback voltage, $v_{fb}$, is lower than the reference voltage, $v_{ref}$, the control voltage to the VCO is higher than expected to achieve the targeted clock frequency.

In some examples, the architecture of the oscillator may define a generic current starved ring oscillator. The control voltage ($v_{ctrl}$) may be converted into current for the ringo oscillator which may determine the output clock frequency. The FVC (frequency-to-voltage converter) circuit 320 is the main component in determining the above equation as indicated. FVC circuit 320 converts the oscillation frequency into voltage ($v_{fb}$, the feedback voltage) which may be compared with the reference voltage, $v_{ref}$, in the regulation loop. This comparison may be performed by amplifier 312. In some examples, the comparison circuitry may include a sample and hold circuit that is clocked by the output clock/N. Depending on the charging current duration, which is dependent on the period of the output clock and its magnitude, the voltage across the capacitor, Ccl, can then be established, thus providing a feedback voltage, $v_{fb}$, for the regulation loop.

As illustrated in FIG. 3, multiple clock phases may be used for modulation of the feedback clock. For example, four clock phases, separated by 90° are illustrated, although additional phases or fewer phases may also be defined. In any case, by modulating the clock phase, $v_{fb}$, i.e., by selecting different clock phases, the output frequency may be modified such that the output frequency is spread with a smaller change in the feedback clock frequency.

Some examples may utilize the regulated loop 302 similar to a PLL in which the latter as the name sake implied is to achieve a phase locked input clock and feedback clock to achieve the multiplication and clock frequency spreading required for the spread spectrum, however for the former, it is more of the voltage locked loop in which it relied on the FVC together with the operational amplifier to achieve the required clock frequency multiplication and clock frequency spreading for EMI emission reduction.

Some examples have virtually no reliance on the characteristic of the open loop oscillator cell for its frequency stability. Instead, the oscillation frequency and the generated frequency spreading as required for the spread spectrum depends solely on the passive component (resistor and capacitor). In some examples, an advantage of relying on passive components may be a decreased dependency on supply voltage relative to techniques where frequency is a function of some aspect of one or more active components. Additionally, the variation with process may actually be much smaller, thus eliminating the need to have a wider tuning range. Furthermore, with calibration, the process variation of resistor and capacitor may be trimmed off, for example, at room temperature.

Exemplary equations for the oscillation frequency and the delta frequency spread for the spread spectrum effect modulation amplitude are as shown below.

$$fosc = \frac{Ic*N}{2*C*(Ic*k*R)} = \frac{N}{2*C*(k*R)}$$

$$\Delta fosc = \frac{Ic*\Delta N}{2*C*(Ic*k*R)} = \frac{\Delta N}{2*C*(k*R)}$$

However, as mentioned earlier, the temperature coefficient of the passive components are not exactly zero, but may still be relatively small as compared to the active devices. In one example, based on a wide variety of silicon processes, the resistance of the poly resistor will change by approximately 0.015% per degree which is significantly smaller as compared to the $g_m$ of the active device in which it may have a 2× variations from room temperature to 125 degree. This will then resulted in a more accurate spread spectrum clock generator without the need of using a PLL of stepping up from an accurate low frequency clock from an RC oscillator.

Figure 4:
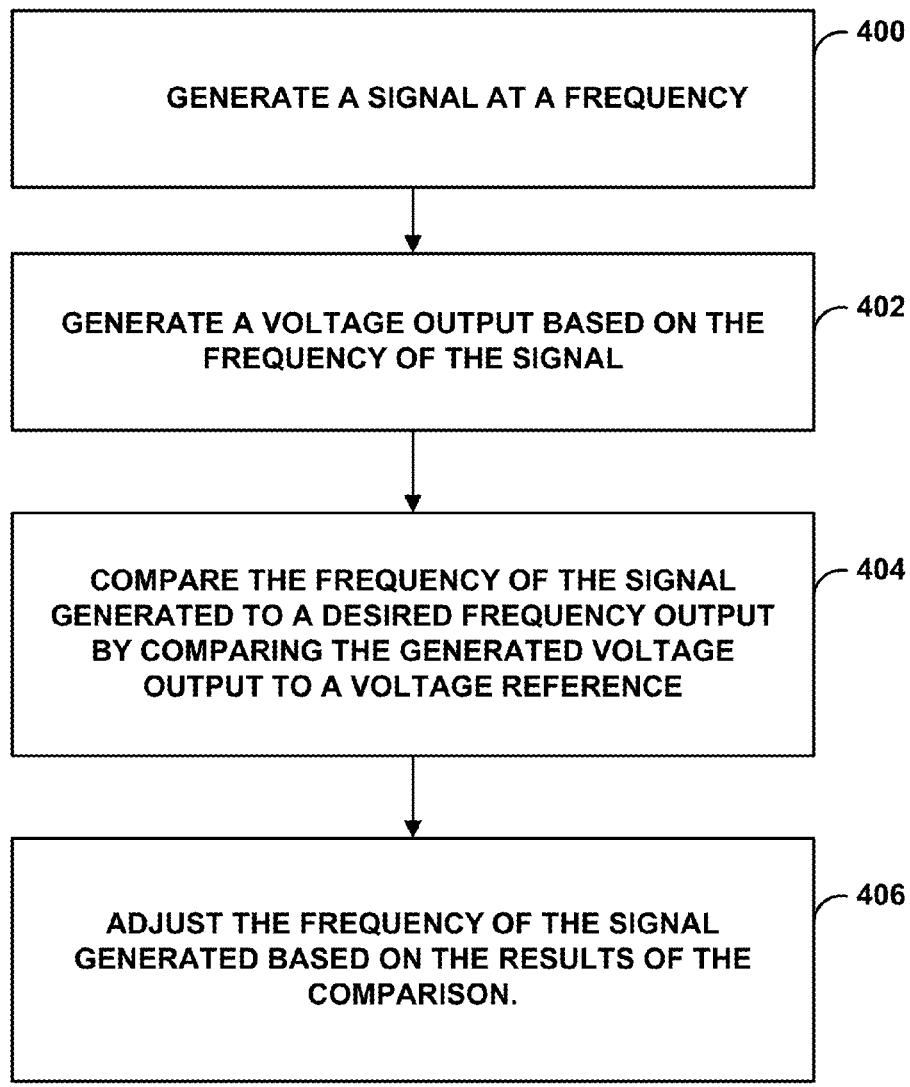
FIG. 4 is a flowchart illustrating an example method for generating a signal, in accordance with one or more aspects of the present disclosure.

FIG. 4 is a flowchart illustrating an example method for generating a signal, e.g., a clock signal, in accordance with one or more aspects of the present disclosure. In some examples, a device may implement the method. For example, a frequency generator 202 may generate a clock signal at a frequency (400). In some examples, frequency generator 202 may be a free running oscillator. For example, frequency generator 202 may be a clock generator circuit, crystal oscillator, R-C circuit with feedback, or any other oscillating circuit.

A frequency-to-voltage converter 204 coupled frequency generator 202, generates a voltage output based on the frequency of the clock signal. The generated voltage output is indicative of the frequency of the generated clock signal. For example, frequency-to-voltage converter 204 may generate a voltage that is proportional to frequency, inversely proportional to frequency, or frequency-to-voltage converter 204 may output a voltage that is related to frequency in some other way, such as a squared or square root, cube, or cube root, logarithmic, or some other mathematical relationship between the input frequency and the output voltage.

An integrator 206 may be coupled to the frequency-to-voltage converter (404). Integrator 206 may be configured to compare the frequency of the clock signal generated to a desired frequency output. This may be done by comparing the generated voltage output to a voltage reference. Accordingly, various comparison circuits may be used. For example, an amplifier circuit, such as an operational amplifier circuit may be used to perform the comparison. In other examples, other comparison circuits may be used to compare the generated voltage output to a voltage reference and thereby compare the frequency of the clock signal generated to a desired frequency output.

The frequency of frequency generator 202 may be adjusted based on the results of the comparison (406). For example, the output of integrator 206 may be an input to frequency generator 202. Thus, frequency may be controlled by controlling the frequency generated.

It will, of course, be understood that the systems, methods described herein may always output a frequency that is not exactly the desired frequency output. The actual frequency output may vary to lessen electro-magnetic interference (EMI) or small variations in the circuitry may still be present due to temperature and other variations.

An example method may include generating a clock signal at a frequency, generating a voltage output based on the frequency of the clock signal, wherein the generated voltage output is indicative of the frequency of the generated clock signal, comparing the frequency of the clock signal generated to a desired frequency output by comparing the generated voltage output to a voltage reference, and adjusting the frequency of the clock signal generated based on the results of the comparison.

In some examples, the method may further include modulating an N divider by a triangular waveform generator and digital delta-sigma modulator to controlled frequency spreading of the clock signal. The method may also include spreading the clock signal to reduce electro-magnetic interference (EMI). Various devices may implement the method, including processor based devices.

A computer-readable storage medium may form part of a computer program product, which may include packaging materials. A computer-readable storage medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. A computer-readable storage medium may comprise a non-transitory computer data storage medium. The techniques additionally, or alternatively, may be realized at least in part by a computer-readable communication medium that carries or communicates code in the form of instructions or data structures and that can be accessed, read, and/or executed by a computer. The computer readable storage medium may store instructions that upon execution by one or more processors cause the one or more processors to perform one or more aspects of this disclosure.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various examples have been described. These and other examples are within the scope of the following claims.

What is claimed is:

1. A method comprising:
generating a clock signal at a frequency;
modulating an N divider by a triangular waveform generator and digital delta-sigma modulator to control frequency spreading of the clock signal;
generating a voltage output based on the frequency of the clock signal, wherein the generated voltage output is indicative of the frequency of the generated clock signal;
comparing the frequency of the clock signal generated to a desired frequency output by comparing the generated voltage output to a voltage reference; and
adjusting the frequency of the clock signal generated based on the results of the comparison.

2. The method of claim 1, wherein the comparison comprises an integration.

3. The method of claim 2, wherein the integration comprises an integration of the voltage output when the voltage output is a lower voltage than a reference voltage to generate a feedback signal to adjust the frequency of the clock signal generated.

4. The method of claim 2, wherein the integration comprises an integration of a reference voltage when the reference voltage is lower than the voltage output to generate a feedback signal to adjust the frequency of the clock signal generated.

5. The method of claim 1, further comprising spreading the clock signal to reduce electro-magnetic interference (EMI).

6. The method of claim 5, wherein spreading the clock signal comprises phase rotation.

7. A device comprising:
a frequency generator for generating a clock signal at a frequency;
an N divider coupled to the frequency generator;
a triangular waveform generator coupled to a digital delta-sigma modulator, the delta-sigma modulator coupled to a phase rotator and multiplexer, the triangular waveform generator, digital delta-sigma modulator, phase rotator and multiplexor configured to frequency spread the clock signal;
a frequency-to-voltage converter coupled to the frequency generator, the frequency-to-voltage converter for generating a voltage output based on the frequency of the clock signal, wherein the generated voltage output is indicative of the frequency of the generated clock signal; and
a comparator, coupled to the frequency-to-voltage converter and configured to compare the frequency of the clock signal generated to a desired frequency output by comparing the generated voltage output to a voltage reference, wherein the frequency of the frequency generator is adjusted based on the results of the comparison.

8. The device of claim 7, wherein the comparison comprises an integration.

9. The device of claim 8, wherein the integration comprises an integration of the voltage output when the voltage output is a lower voltage than a reference voltage to generate a feedback signal to adjust the frequency of the clock signal generated.

10. The device of claim 8, wherein the integration comprises an integration of a reference voltage when the reference voltage is lower than the voltage output to generate a feedback signal to adjust the frequency of the clock signal generated.

11. The device of claim 7, further comprising spreading the clock signal to reduce electro-magnetic interference (EMI).

12. The device of claim 7, wherein spreading the clock signal comprises phase rotation.

13. A device comprising:
  means for generating a clock signal at a frequency;
  means for modulating an N divider by a triangular waveform generator and digital delta-sigma modulator to control frequency spreading of the clock signal;
  means for generating a voltage output based on the frequency of the clock signal, wherein the generated voltage output is indicative of the frequency of the generated clock signal;
  means for comparing the frequency of the clock signal generated to a desired frequency output by comparing the generated voltage output to a voltage reference; and
  means for adjusting the frequency of the clock signal generated based on the results of the comparison.

14. The device of claim 13, wherein the comparison comprises an integration.

15. The device d of claim 14, wherein the integration comprises an integration of the voltage output when the voltage output is a lower voltage than a reference voltage to generate a feedback signal to adjust the frequency of the clock signal generated.

16. The device of claim 14, wherein the integration comprises an integration of a reference voltage when the reference voltage is lower than the voltage output to generate a feedback signal to adjust the frequency of the clock signal generated.

17. The device of claim 13, further comprising means for spreading the clock signal to reduce electro-magnetic interference (EMI).

\* \* \* \* \*